(12) United States Patent
Moore et al.

(10) Patent No.: US 8,516,237 B2
(45) Date of Patent: Aug. 20, 2013

(54) METHOD AND SYSTEM FOR PROVIDING INFORMATION TO A SUBSEQUENT OPERATING SYSTEM

(75) Inventors: Sherry Qianhong Moore, Fremont, CA (US); Konstantin Ananyev, Naas (IE); Darrin P. Johnson, San Jose, CA (US)

(73) Assignee: Oracle America, Inc., Redwood Shores, CA (US)

( * ) Notice: Subject to any disclaimer, the term of this patent is extended or adjusted under 35 U.S.C. 154(b) by 509 days.

(21) Appl. No.: 12/686,203

(22) Filed: Jan. 12, 2010

(65) Prior Publication Data

US 2011/0173426 A1 Jul. 14, 2011

(51) Int. Cl.
*G06F 15/177* (2006.01)

(52) U.S. Cl.
USPC ............ 713/100; 713/1; 713/2; 714/1; 714/25

(58) Field of Classification Search
USPC ................ 713/1, 2, 100; 714/1, 2, 4.2, 25
See application file for complete search history.

(56) References Cited

U.S. PATENT DOCUMENTS

| | | | |
|---|---|---|---|
| 6,715,062 B1 * | 3/2004 | Moore | 712/227 |
| 2005/0164795 A1 * | 7/2005 | Whitten et al. | 463/44 |
| 2005/0228769 A1 * | 10/2005 | Oshima et al. | 707/1 |
| 2009/0276618 A1 * | 11/2009 | Madjlessi | 713/2 |

OTHER PUBLICATIONS

Sun Microsystems, Inc., "System Administration Guide: Basic Administration, Nov. 2008," Santa Clara, California, pp. 1-16 and 175-355 (197 pages).

* cited by examiner

*Primary Examiner* — Paul Yanchus, III
(74) *Attorney, Agent, or Firm* — Osha Liang LLP

(57) ABSTRACT

A method for transferring execution to a subsequent operating system. The method includes rebooting a computer system. Rebooting the computer system includes initializing an in-kernel boot loader. The in-kernel boot loader executes in a kernel of an initial operating system. Rebooting the computer system further includes populating, by the in-kernel boot loader, an initialization data structure using system data gathered during the execution of the initial operating system, loading, by the in-kernel boot loader, the subsequent operating system, and transferring control of the computer system from the initial operating system to the subsequent operating system. The subsequent operating system accesses the initialization data structure to identify available hardware. The method further includes executing the subsequent operating system on the available hardware of the computer system.

14 Claims, 5 Drawing Sheets

METHOD AND SYSTEM FOR PROVIDING INFORMATION TO A SUBSEQUENT OPERATING SYSTEM

BACKGROUND

In general, the functionality of a computer system is achieved using the combination of hardware and software. The hardware includes functionality to execute the instructions defined in the software. The combination of the hardware and the software allows the user to perform various tasks, such as play games, perform word processing applications, perform complicated modeling of a region, design new technologies, and/or perform other such tasks.

One type of software is an application. The application provides the user with the ability to perform the tasks. Applications execute in an execution environment of an operating system. Specifically, the operating system is a type of software that provides an interface between hardware and applications, enforces the sharing of the computer system hardware and software resources, and coordinates the performance of various tasks. Thus, the operating system is a type of software that manages the execution of the computer system.

Execution of the operating system is initiated during a boot process. The following is the typical process to initiate the execution of the operating system when power is provided to the computer system. When power is provided to a computer system, firmware on the computer system starts executing. Firmware is a program that is stored in a fixed location of read only memory (ROM). Because of the fixed location, the processor of the computer system is able to obtain instructions of the firmware from the fixed location when power is provided to the processor.

When executed, the firmware may perform a test of the computer system. During the test, the firmware determines whether any hardware components are non-functioning at the time of the test. The test may not be able to identify a faulty hardware component having intermittent errors if such error-prone component is functioning at the time of the test. For example, the error-prone component may respond at the time of the test even though the error-prone component produced errors both before and after the test. However, if a hardware component is non-functioning at the time of the test, the firmware may disable the hardware component so that the operating system cannot detect the component. Additionally, the firmware may disable components as configured by the user accessing the firmware interface.

Continuing with the initiation of the operating system when powering up the computer system, after performing the check, the firmware starts execution of a program called a boot loader. The boot loader is a program designed to find and initiate execution of the operating system. In order to initiate the execution of the operating system, the boot loader searches for a boot image that includes operating system. Specifically, the boot image includes a root file system with the files of the operating system. When the boot loader finds the boot image, the boot loader loads and transfers control to the kernel of the operating system.

SUMMARY

In general, in one aspect, embodiments of the invention relate to a method for transferring execution to a subsequent operating system. The method includes rebooting a computer system. Rebooting the computer system includes initializing an in-kernel boot loader. The in-kernel boot loader executes in a kernel of an initial operating system. Rebooting the computer system further includes populating, by the in-kernel boot loader, an initialization data structure using system data gathered during the execution of the initial operating system, loading, by the in-kernel boot loader, the subsequent operating system, and transferring control of the computer system from the initial operating system to the subsequent operating system. The subsequent operating system accesses the initialization data structure to identify available hardware. The method further includes executing the subsequent operating system on the available hardware of the computer system.

In general, in one aspect, embodiments of the invention relate to a computer system that includes a processor, memory, and software instructions stored in memory. The software instructions cause the computer system to reboot a computer system. Rebooting the computer system includes initializing an in-kernel boot loader. The in-kernel boot loader executes in a kernel of an initial operating system. Rebooting the computer system further includes populating, by the in-kernel boot loader, an initialization data structure using system data gathered during the execution of the initial operating system, loading, by the in-kernel boot loader, the subsequent operating system, and transferring control of the computer system from the initial operating system to the subsequent operating system. The subsequent operating system accesses the initialization data structure to identify available hardware. The subsequent operating system executes on the available hardware of the computer system.

In general, in one aspect, embodiments of the invention relate to a computer readable medium comprising executable instructions for transferring execution to a subsequent operating system, which when executed by a processor performs a method. The method includes rebooting a computer system. Rebooting the computer system includes initializing an in-kernel boot loader. The in-kernel boot loader executes in a kernel of an initial operating system. Rebooting the computer system further includes populating, by the in-kernel boot loader, an initialization data structure using system data gathered during the execution of the initial operating system, loading, by the in-kernel boot loader, the subsequent operating system, and transferring control of the computer system from the initial operating system to the subsequent operating system. The subsequent operating system accesses the initialization data structure to identify available hardware. The subsequent operating system executes on the available hardware of the computer system.

Other aspects of the invention will be apparent from the following description and the appended claims.

DETAILED DESCRIPTION

Figure 1:
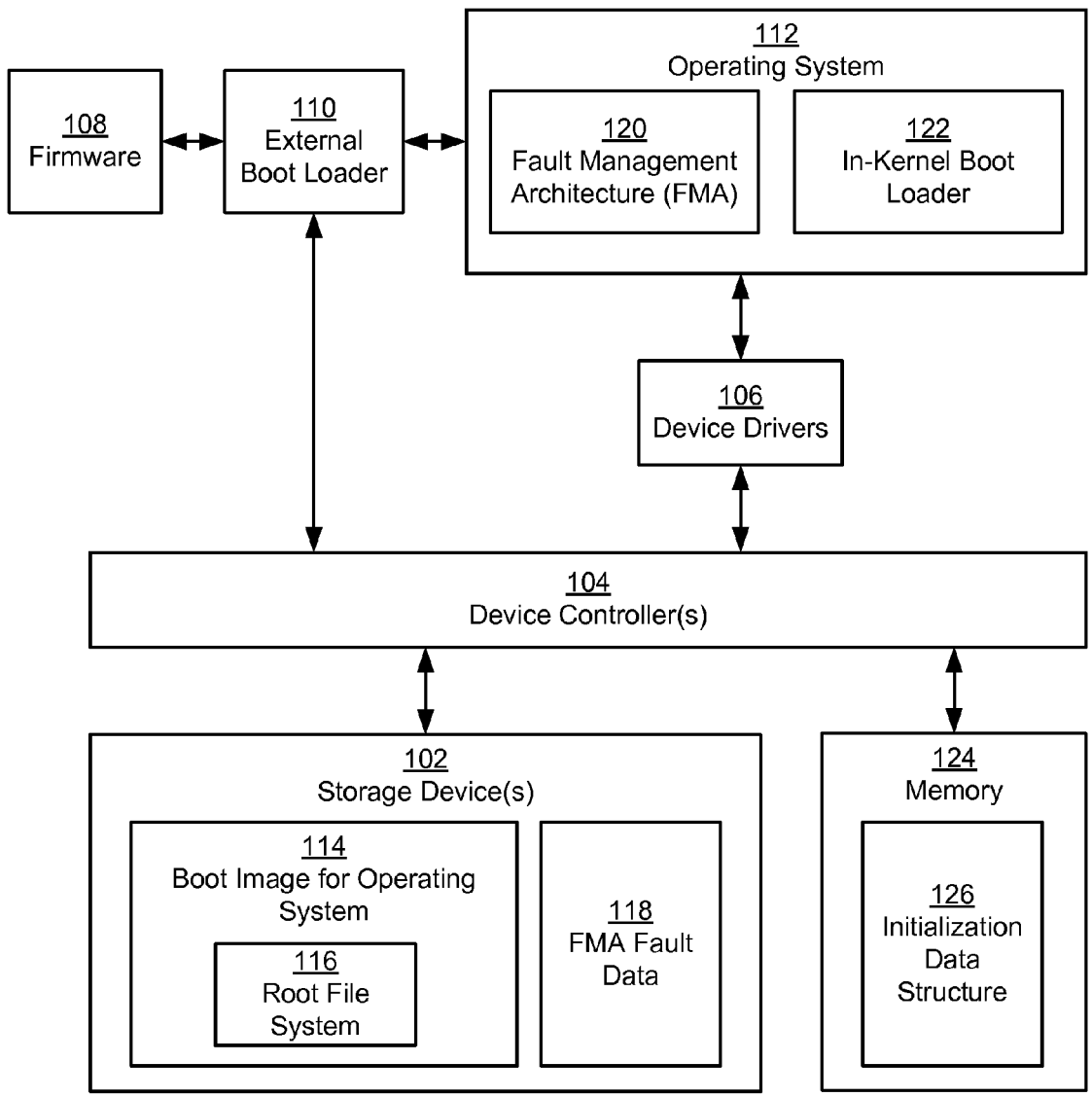
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention are directed to providing information to a subsequent operating system from an initial operating system. The subsequent operating system uses the information during the boot process. In one or more embodiments of the invention, an in-kernel boot loader in the initial operating system populates an initialization data structure using system data gathered during execution of the initial operating system. The subsequent operating system accesses the initialization data structure to retrieve the information and execute it accordingly.

For example, the information may include a list of available hardware on the computer system. The available hardware is hardware on which the subsequent operating system may execute without performing any corrective action. Specifically, the available hardware in the list may exclude hardware that is deemed to be faulty. Accordingly, in the example, the excluded hardware is deemed unavailable, and, thus, prevented from causing problems during the booting and executing of the subsequent operating system even if the errors signifying the existence of a fault intermittently occur.

As another example, the initial operating system may inform a subsequent operating system when a core dump is required so that the core dump may be delayed until after the subsequent operating system starts executing. Specifically, rather than waiting until a core dump is completed before booting the subsequent operating system, the initial operating system may inform the subsequent operating system that the core dump is required on a specific portion of memory. In accordance with one or more embodiments of the invention, the subsequent operating system may promptly start executing while simultaneously ensuring that the subsequent operating system does not overwrite the portion of memory on which the core dump is performed until after the core dump is completed.

For the purposes of the description below, the terms initial and subsequent with reference to operating system refer to a temporal relationship between the two operating systems. Specifically, the initial operating system executes before the subsequent operating system. The initial operating system may or may not be the first operating system to execute on the computer system. Further, once the subsequent operating system starts execution, the subsequent operating system may be an initial operating system in relation to future subsequent operating systems executing on the computer system.

FIG. 1 shows a schematic diagram of a system in accordance with one or more embodiments of the invention. As shown in FIG. 1, the system includes a storage device (102), device controllers (104), device drivers (106), firmware (108), an external boot loader (110), an operating system (112), and memory (124). Each of these components is described below.

In one or more embodiments of the invention, a storage device (102) is a hardware device on which the operating system is located. For example, the storage device (102) may be a hard drive, flash memory, a floppy disk, a compact disk, a networked storage server, or any other type of hardware or combination thereof that is used for storage. Further, the storage device (102) may be partitioned. In such a scenario, multiple operating systems may exist on a single storage device (102), each in a separate partition. Although FIG. 1 shows a single storage device (102), the system may include or be operatively connected to multiple storage devices. The multiple storage devices may be of heterogeneous types. For example, one storage device may be flash memory while another storage device is a hard disk.

In one or more embodiments of the invention, the storage device (102) includes a boot image (114). A boot image (114) is a representation of the operating system as viewed by a boot loader (e.g., an external boot loader (110), an in-kernel boot loader (122)) (discussed below). The boot image (114) includes a root file system (116) in accordance with one or more embodiments of the invention.

In one or more embodiments of the invention, the root file system (116) is the initial file system on which other file systems may be mounted. A file system is an organization mechanism for the storage and retrieval of files. The root file system (116) stores the files for the operating system.

Although FIG. 1 shows a single boot image (114) and a single root file system (116), multiple boot images, each having a corresponding root file system, may exist. Specifically, the system may have multiple possible operating systems to execute. In one or more embodiments of the invention, the multiple possible operating systems may correspond to different versions or different editions of the same operating system and/or may correspond to operating systems from different vendors. In one or more embodiments of the invention, the initial operating system and the subsequent operating system may be obtained from the same boot image or may be obtained from different boot images. If the initial operating system and the subsequent operating system are obtained from the same boot image, then the initial operating system and the subsequent operating system may be instances of the same operating system. If the initial operating system and the subsequent operating system are obtained from different boot images, then the initial operating system and the subsequent operating system may be instances of the same or instances of different operating systems.

As shown in FIG. 1, the storage device(s) may also include functionality to store fault management architecture (FMA) fault data (118) in accordance with one or more embodiments of the invention. The FMA fault data (118) is data generated by the FMA (120) (discussed below). Specifically, the FMA fault data (118) includes information about which components of the computer system exhibit faults in accordance with one or more embodiments of the invention. The FMA fault data (118) is discussed below with reference to the FMA (120).

Continuing with FIG. 1, a device controller (104) is a hardware component that provides a translation between the processor(s) (e.g., central processing unit(s)) (not shown) on the computer system and the storage device (102). Specifically, the device controller (104) is an interface between the processor and the storage device(s) (102). Further, the device controller includes functionality to transfer data between the storage device(s) (102) connected to the device controller (104) and components of the computer system, such as memory (124) and the processor(s).

In one or more embodiments of the invention, the device controller (104) is connected to a device driver (106). In one or more embodiments of the invention, the device driver (106) is a software program that provides an interface between the operating system and the device controller (104). Specifically, in order for the operating system to retrieve or store data from/to the storage device (102), the operating system (112) invokes a routine in the device driver (106). In response, the device driver (106) issues commands to the device via the device controller (104). The device controller (104) sends the commands to the device. In one or more embodiments of the invention, which device driver (106) is used is dependent on the hardware device and the operating system (112). Further, in one or more embodiments of the invention, the device driver (106) for the storage device (102) is loaded when the operating system is loaded.

Continuing with the FIG. 1, the firmware (108) is a program in a fixed memory address that starts when power is provided to the computer system. The firmware (108) includes the initial program executed by the processor. For example, the firmware (108) may be a basic input/output system (BIOS), extensible firmware interface (EFI), or other such type of firmware.

In one or more embodiments of the invention, the firmware (108) includes functionality to initiate execution of the external boot loader (110). The external boot loader (110) may be a part of the firmware (108). Alternatively, the external boot loader (110) may be stored separately from the firmware (108). The external boot loader (110) is a program that includes functionality to start the execution of the operating system (112).

In one or more embodiments of the invention, the external boot loader (110) is connected to an operating system (112). Specifically, in one or more embodiments of the invention, the external boot loader (110) includes functionality to initiate execution of the kernel of the operating system (112). The kernel of operating system (112) is a protected portion of the operating system (112). The kernel of the operating system (112) includes functionality to identify the location of the root file system (116) and mount the root file system (116) from the identified location.

In one or more embodiments of the invention, the operating system (112) includes an FMA (120) and an in-kernel boot loader (122). Alternatively, the FMA may execute as a user-level application. Specifically, the operating system (112) may not include the FMA (120), but rather provide services to the FMA (120). Further, the operating system (112) may include additional components not shown to simplify the description, but known by those of ordinary skill in the art. The FMA (120) and in-kernel boot loader (122) are discussed below.

In one or more embodiments of the invention, the FMA (120) includes functionality to detect a fault of hardware components in the computer system. Specifically, a fault is a defect of hardware that may produce an error. An error is an unexpected condition, result, signal, or datum in the computer system or network. Thus, an error may signify the existence of a fault in accordance with one or more embodiments of the invention. When an error is detected, the FMA (120) includes functionality to analyze the error, determine whether a fault exists, perform corrective actions, log the fault, and/or notify an administrator about the fault. The FMA fault data (118) may include information about the error, the fault, corrective actions, and notifications in accordance with one or more embodiments of the invention. For example, if the corrective action is that the FMA (120) disables a processor or a memory device so that disabled processor or memory device is no longer available for use by the currently executing operating system, information about the processor or memory device being disabled may be stored in the FMA fault data (118).

In one embodiment of the invention, the above described FMA may be implemented as described in U.S. Pat. No. 7,231,550 filed on Oct. 31, 2003, entitled "An Event Protocol and Resource Naming Scheme," assigned to the assignee of this application, and hereby incorporated by reference. Additionally or alternatively, in one or more embodiments of the invention, the above described FMA may be implemented as described in U.S. patent application Ser. No. 12/329,146, filed on Dec. 5, 2008, entitled "Method and System for Platform Independent Fault Management," assigned to the assignee of this application, and hereby incorporated by reference.

Continuing with the operating system (112), the operating system (112) may also include an in-kernel boot loader (122). In one or more embodiments of the invention, the in-kernel boot loader (122) is a boot loader that executes in the execution environment provided by the operating system. Specifically, the in-kernel boot loader (122) executes, at least in part, while other services of the operating system are executing. In one or more embodiments of the invention, the in-kernel boot loader includes functionality to create an initialization data structure (126) from system data (not shown) generated during the execution of the operating system (112). In one or more embodiments of the invention, the system data may include FMA fault data and/or core dump data. The initialization data structure (126) is discussed below and in FIG. 2. In one or more embodiments of the invention, the in-kernel boot loader (122) includes functionality to store the initialization data structure (126) in memory (124).

In one or more embodiments of the invention, the memory (124) is a device, directly accessible by a processor (not shown), for storing data. For example, the memory may correspond to dynamic random access memory (DRAM), non-volatile dynamic random access memory (NVDRAM), flash memory, and other forms of memory.

Each of the components shown in FIG. 1 may be a part of a computer system. In one or more embodiments of the invention, the computer system may be any type of computing device known in the art. For example, the computer system may be a server, a personal computer, a workstation computer, or any other computer system. Additionally, some components of the computer system, such as the storage device(s) may be peripheral devices of the computer system. Further, the booting of the computer system, by powering up the computer system or rebooting the computer system, may be initiated remotely or while in the physical vicinity of the computer system (e.g., by selecting a hardware or software button).

As an alternative to a physical device, the computer system may be a virtual system executing in a partition of a physical computing device. In the scenario in which the computer system is a virtual computer system, both the initial operating system and the subsequent operating system execute in the same partition.

For example, the partition may be a software partition. For example, the computer system includes a host operating system (not shown) configured to execute one or more virtual machines Broadly speaking, the virtual machines are distinct operating environments configured to inherit underlying functionality of the host operating system via an abstraction layer. In one or more embodiments of the invention, each virtual machine includes a separate instance of an operating system. For example, the Xen® virtualization project allows for multiple guest operating systems executing in a host operating system. Xen® is a trademark overseen by the Xen Project Advisory Board. As another example, the computer system may be a virtual computer system executing in hardware partitions.

Figure 2:
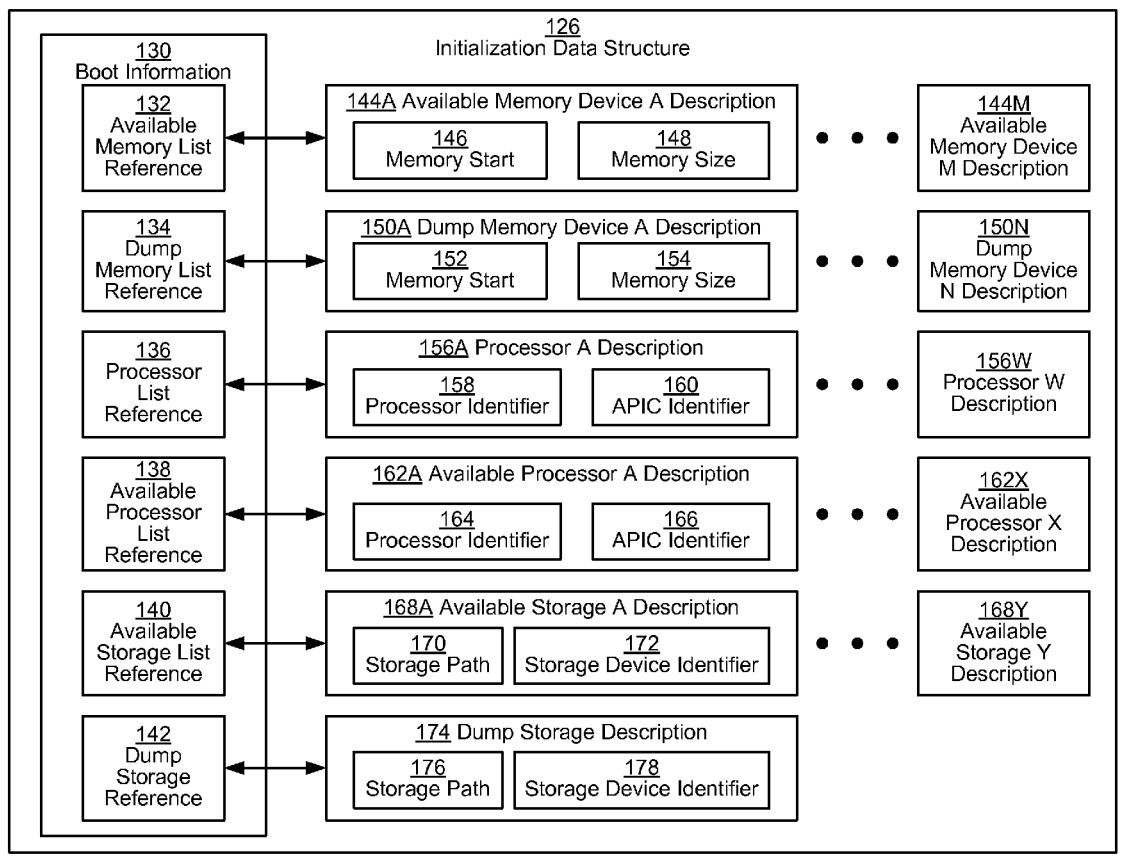
FIG. 2 shows a schematic diagram of initialization data structure in accordance with one or more embodiments of the invention.

FIG. 2 shows an initialization data structure (126) in accordance with one or more embodiments of the invention. Specifically, FIG. 2 shows an example of a possible arrangement of data in the initialization data structure (126). As shown in the example FIG. 2, the initialization data structure (126) includes boot information (130).

In one or more embodiments of the invention, the boot information (130) stores references to lists, or list references, for each of the components of the computer system represented by the initialization data structure. For example, the boot information may be of type "struct" that includes a reference to each list of components. The reference may be the starting address in which the corresponding list is located in accordance with one or more embodiments of the invention.

In one or more embodiments of the invention, the boot information (130) may include an available memory list reference (132), a dump memory list reference (134), a processor list reference (136), an available processor list reference (138), an available storage list reference (140), and a dump storage reference (142). In one or more embodiments of the invention, when information about a component is not applicable, then the reference is excluded from the data structure or has a pre-defined default value. For example, if a core dump is not required, then the dump storage reference (142) may be excluded from that boot information (130) or have the value of all '0's. Continuing with FIG. 2, each part of the boot information (130) is discussed below.

In one or more embodiments of the invention, the available memory list reference (132) is a reference to a list of available memory device descriptions (144A, 144M) in the computer system. In one or more embodiments of the invention, memory in the computer system is available when the subsequent operating system can use the memory. For example, memory disabled by the FMA during execution of the initial operating system may be deemed unavailable and, therefore, excluded from the available memory device descriptions.

In one or more embodiments of the invention, each available memory device description (144A, 144M) provides information to uniquely identify an available memory device. For example, the available memory device description (144A, 144M) may include a memory start (146) and a memory size (148) for the corresponding memory device. In one or more embodiments of the invention, the memory start (146) specifies the first address of available memory in accordance with one or more embodiments of the invention. In one or more embodiments of the invention, the memory size (148) specifies the amount of memory to the end of the available memory. The memory size (148) may specify an offset from the starting address or specify an ending address in accordance with one or more embodiments of the invention. Other techniques may be used to uniquely identify a memory device in accordance with one or more embodiments of the invention. In one or more embodiments of the invention, the available memory device description (144A, 144M) also includes a reference (not shown) to the next available memory device description in the list of available memory devices.

Different granularity levels may be used to reference a memory device in the memory device description in accordance with one or more embodiments of the invention. For example, the memory device description may correspond to a range of memory addresses on the same physical hardware component. Alternatively, the memory device description may be based on the granularity of an entire field replaceable unit (e.g., an entire dual inline memory module (DIMM)).

In one or more embodiments of the invention, the dump memory list reference (134) includes a reference to a list of dump memory device descriptions (150A, 150N). The dump memory device description (150A, 150N) specifies memory ranges that need to be written to a dump device. Specifically, memory referenced by the dump memory device description (150A, 150N) is the core memory on which the subsequent operating system needs to perform a core dump before using the memory. In one or more embodiments of the invention, each dump memory device description (150A, 150N) includes a memory start (152) and a memory size (154). The memory start (152) identifies the starting address of memory to be written to a storage device. The memory size (154) specifies the amount of memory starting from the memory start (152) that needs to be written to the storage device. The dump memory device description (150A, 150N) may also include a reference (not shown) to the next dump memory device description in the dump memory device list.

In one or more embodiments of the invention, the processor list reference (136) includes a reference to a list of processors in the computer system. Specifically, the processors referenced in the list may include all processors in the computer system. By specifying all processors in the computer system, the FMA in the initial operating system may provide, through the in-kernel boot loader, the list of all processors to the subsequent operating system in order for the subsequent operating system to inform end users to perform dynamic reconfiguration or hot plug to replace the faulty processors.

The processor list reference (136) references processor descriptions (156A, 156W). Each processor description (156A, 156W) includes a processor identifier (158) and/or an advance programmable interrupt controller (APIC) identifier (160). The processor identifier (158) uniquely identifies the processor. In one or more embodiments of the invention, the processor identifier is a hardware identifier that is stored in hardware registers during manufacturing or a logical identifier assigned by an operating system. In one example, the physical processor identifier is the APIC ID. For example, list of available processors may be listed as a bit mask. In the bit mask, 1 may denote a present physical CPU, and 0 represents an absent one. For example, an APIC bitmask of 0xf8 would mean that CPUs 0, 1, 2 are absent, 3, 4, 5, 6, 7 are present. In one or more embodiments of the invention, if a bitmask is not used, the processor description (156A, 156W) also includes a reference (not shown) to the next processor description in the list of processors.

In one or more embodiments of the invention, the available processor list reference (138) includes a reference to a listing of available processor descriptions (162A, 162X). Each available processor description identifies an available processor. The available processors include processors that the subsequent operating system may use immediately upon rebooting. Specifically, the available processors are processors that are deemed to be functioning properly and not faulty. In one or more embodiments of the invention, each available processor description (162A, 162X) includes a processor identifier (164) and an APIC identifier (166) for the corresponding processor. In one or more embodiments of the invention, the processor identifier (164) and the APIC identifier (166) may identify processors similar to the processor identifier (158) and the APIC identifier (160) discussed above. In one or more embodiments of the invention, the available processor description (162A, 162X) also includes a reference (not shown) to the next available processor description in the list of available processors.

In one or more embodiments of the invention, the available storage list reference (140) includes a reference to a listing of available storage descriptions (168A, 168Y). In one or more embodiments of the invention, each available storage description (168A, 168Y) uniquely identifies an available storage device. In one or more embodiments of the invention, the available storage device is a storage device that the subsequent processing system may use immediately while booting the computer system. Specifically, the available storage devices correspond to storage devices that are deemed to be functioning properly. In one or more embodiments of the invention, each of the available storage descriptions (168A, 168Y) include a storage path (170) for the storage device and a storage device identifier (172). In one or more embodiments of the invention, the storage path (170) may have a hardware and/or software representation. As an example of software representation, if the storage path uses a ZFS™ file system for boot purposes, the storage path may be represented as "zfs-bootfs=rpool/ROOT/zfsbe2" and bootpath="/pci@0,0/pci8086,25f8@4/pci1000,3150@0/sd@0,0:a." ZFS™ is trademark of Sun Microsystems Inc. located in Santa Clara, Calif. In one or more embodiments of the invention, the storage path (170) may correspond to other representations without departing from the scope of the invention. For example, the storage path (170) may correspond to the hardware location of storage in the chassis, a vendor specific identifier, or any other identifier that the subsequent operating system can map to the mechanism the subsequent operating system uses to construct a storage pool.

In one or more embodiments of the invention, the dump storage reference references a dump storage description (174). In one or more embodiments of the invention, the dump storage description (174) identifies the dump device to store a core dump. Specifically, the dump storage description (174) provides a mechanism for the initial operating system to inform the subsequent operating system where to store the data for the core dump. In one or more embodiments of the invention, the dump storage description (174) include a storage path (176) and a storage device identifier (178). In one or more embodiments of the invention, the storage path (176) and the storage device identifier (178) may identify storage devices similar to the storage path (170) and the storage device identifier (172) discussed above.

In one or more embodiments of the invention, the initialization data structure may distinguish between components that are immediately available for use and components that are available only after a core dump is performed. For example, if the core dump requires that a large amount of memory is reserved for performing the core dump, then to prevent thrashing, for example, the number of processors may be limited until the reserved memory is available to the operating system to use. In such a scenario, the initialization data structure may include a delayed processor list that includes delayed processor descriptions of processors that are unavailable until after the core dump is performed.

As another example, it may be beneficial to only have a reduced set of hardware components, such as memory and storage device, so that software services can available when performing a core dump. In such a scenario, the initialization data structure may specify the hardware components available while the core dump is performed, and hardware components available after the core dump is completed. By way of an example and not intended to limit the scope of the invention, software services that could be made available as soon as possible while the core dump is being performed may include Domain Name Service, Network Information Services, Secure Shell Services, Mail, etc. In the example, non-time-critical services offered by the system, such as file system snapshots, network load balancing, may be made available only after the system has completed the core dump.

Although FIG. 2 shows each of the list references as referring to lists having multiple device descriptions, any of the lists may have only a single device description without departing from the scope of the invention. For example, if the computer system includes only one available processor, then the available processor list reference may reference a list having only a single available processor description. Conversely, although FIG. 2 shows the dump storage reference (142) as referring to only a single dump device description, the dump storage reference may be a reference to a list that includes multiple dump device descriptions without departing from the scope of the invention.

Although FIG. 2, shows one possible arrangement of data in the data structures, the initialization data structure may use other arrangements of data without departing from the scope of the invention. For example, rather than the boot information including a list reference for each of the types of components represented by the initialization data structure, the boot information may directly include the list of components.

Moreover, the same component may be identified using different techniques. In one or more embodiments of the invention, any of the techniques may be used without departing from the scope of the invention. Specifically, the component may be directly identified or require inference to identify the component. For example, rather than listing available memory directly, all memory devices may be listed and memory devices determined to have faults may be identified in the listing. Accordingly, the available memory is the memory that is in the list of all memory devices and not in the list of memory devices determined to have faults. Similarly, rather than the initialization data structure including a list of all processors, the initialization data structure may include a list of available processors and a list of faulty processors. Thus, combining the two list provides the list of all available processors.

Figure 3A:
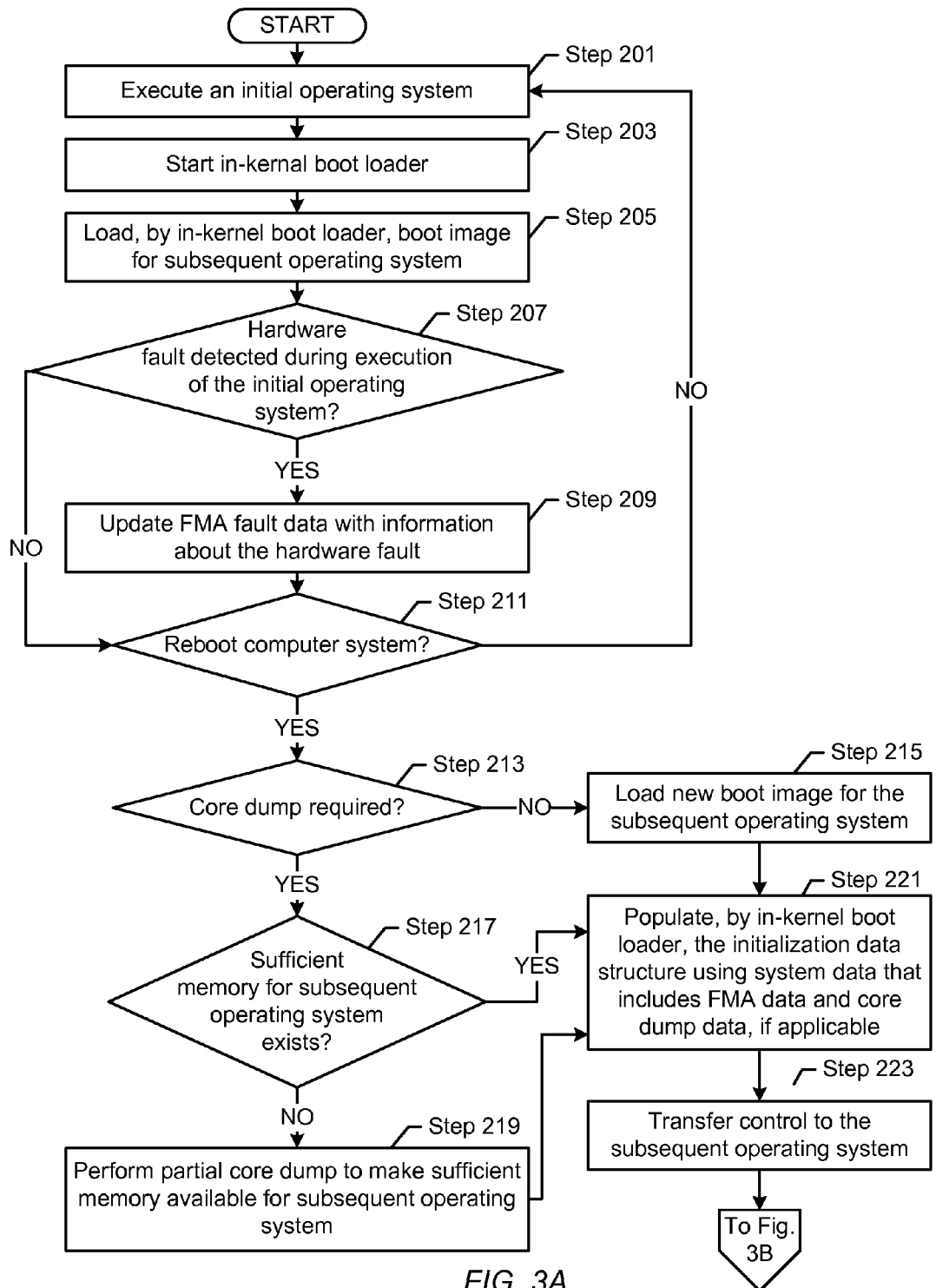
FIGS. 3A-3B show flowcharts in accordance with one or more embodiments of the invention.
Figure 3B:
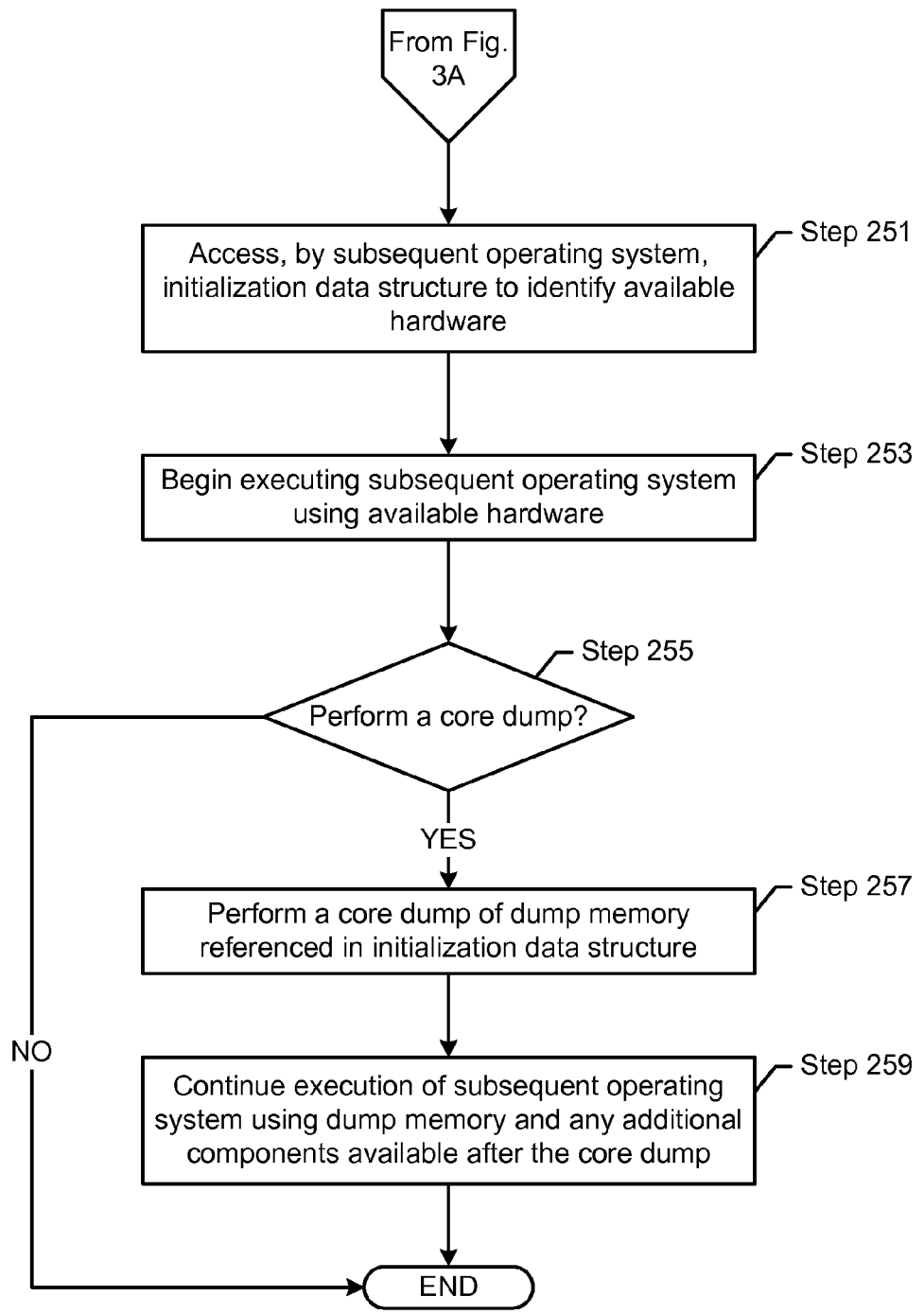

FIG. 3A-3B show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. In addition, steps such as store acknowledgements have been omitted to simplify the presentation. Furthermore, determination steps discussed below may be actively or passively performed. For example, the steps may be performed using polling or be interrupt driven. Thus, the determination steps may not require a processor to process an instruction unless an interrupt is received to signify a condition. As another example, the determination step may be performed by performing a test, such as checking a data value to test whether the value is consistent with the tested condition.

FIG. 3A shows steps performed to initiate a transfer to the subsequent operating system in accordance with one or more embodiments of the invention. In Step 201, the initial operating system is executed. As discussed above, the initial operating system may be the first operating system to execute on the computer system, or an operating system that executes after a reboot. During the execution of the initial operating system, the FMA application(s) executes. In one or more embodiments of the invention, the FMA application(s) executes as a user-level process. Further, in Step 203, the in-kernel boot loader is started. Specifically, the in-kernel boot loader may start as a background process of the kernel. In one or more embodiments of the invention, the memory and processing requirements of the in-kernel boot loader are minimal.

In Step 205, the in-kernel boot loader loads the boot image for the subsequent operating system. In one or more embodiments of the invention, during execution of the initial operating system and before any reboot commands is received, a boot image for the subsequent operating system is loaded into memory. In one or more embodiments of the invention, the section of memory in which the boot image is loaded is reserved for the subsequent operating system. By preloading a boot image, if a sudden failure of the initial operating system occurs, then execution may quickly switch to the subsequent operating system. In one or more embodiments of the invention, the boot image loaded by the boot loader is a backup of the initial operating system. Thus, the boot image preloaded by the in-kernel boot loader may not be the same boot image used by the subsequent operating system. For example, if a normal reboot occurs, then the subsequent operating system may be a different type of operating system than the initial operating system.

Continuing with FIG. 3A, in Step 207, a determination is made whether a hardware fault is detected during the execution of the initial operating system. As discussed above, the FMA application may execute during the execution of the initial operating system. During execution, the FMA application may receive an error report identifying that a hardware or software component of the computer system. A diagnosis engine of the FMA may analyze the error report in conjunction with any historical data to determine whether a hardware fault exists.

In Step 209, if a hardware fault is detected, then the FMA fault data is updated with information about the hardware fault. For example, the FMA fault data may be updated with information about notifications sent, any hardware components disabled based on the fault, etc. Specifically, information about the hardware fault is stored in the appropriate spot of the FMA fault data. The information may be stored as a part of a log file, in a hierarchy associated with the hardware component, or in other such files.

Regardless of whether a hardware fault is detected, in Step 211, a determination is made whether to reboot the computer system. Specifically, a determination is made whether a reboot command is received. As discussed above, the reboot command may be based on the computer system crashing or halting unexpectedly, or based on receiving a selection of a hardware or software command. If the reboot is based on receiving a selection of a hardware or software command, the command may or may not be while in the physical vicinity of the computer system. For example, the command may be generated from an auxiliary device, such as another computer system.

If a determination is made not to reboot the computer system, then the initial operating system continues execution with Step 201. Specifically, the initial operating system continues execution until a reboot command is received.

In Step 213, a determination is made whether a core dump is required in accordance with one or more embodiments of the invention. In one or more embodiments of the invention, a core dump is required if the computer system crashes.

If a core dump is not required, in Step 215, a new boot image is loaded for a subsequent operating system in accordance with one or more embodiments of the invention. In one or more embodiments of the invention, a new boot image is loaded only when the subsequent operating system is different from the initial operating system or when the boot image is corrupted. In alternative embodiments of the invention, the new boot image is loaded into memory regardless of whether the subsequent operating system is the same or different from the initial operating system.

If a core dump is required in Step 213, then in Step 217, a determination is made whether sufficient memory for the subsequent operating system exists. Specifically, sufficient memory exists when the subsequent operating system may begin execution with the initial services with the memory available memory. In one or more embodiments of the invention, memory is reserved during the execution of the initial operating system to ensure that sufficient memory exists. Specifically, enough memory intentionally remains unused during the execution of the initial operating system to allow for the subsequent operating system to start executing. In alternative embodiments, the memory is not reserved.

If a sufficient memory for the subsequent operating system does not exist, then in Step 219, a partial core dump is performed to make sufficient memory available for subsequent operating system. Specifically, the initial operating system starts storing data in the memory to a storage device. In one or more embodiments of the invention, once sufficient memory is available for the subsequent operating system, then transferring control to the subsequent operating system is initiated.

In Step 221, regardless of whether a core dump is performed or sufficient memory is available, the in-kernel boot loader populates the initialization data structure using system data that includes the FMA fault data. Specifically, the in-kernel boot loader accesses the FMA fault data to identify components that should be excluded from being available component for the subsequent operating system. In one or more embodiments of the invention, the components that are excluded correspond to components that are disabled during execution of the initial operating system and the FMA identified faulty components. Further, if the subsequent operating system needs to perform a core dump, then the in-kernel boot loader populates the initialization data structure with information about the core dump. Specifically, the in-kernel boot loader may populate the data structure with the dump memory device description and the dump storage device description. The in-kernel boot loader may also populate the data structure with a list of components and/or services that should be available during and after the core dump in accordance with one or more embodiments of the invention.

In Step 223, control is transferred to the subsequent operating system. Specifically, the in-kernel boot loader starts the initial routine in the boot image of the subsequent operating system executing on a processor.

FIG. 3B shows a flow diagram for the subsequent operating system to execute. In Step 251, the subsequent operating system accesses the initialization data structure to identify available hardware in accordance with one or more embodiments of the invention. Specifically, while booting the subsequent operating system, the subsequent operating system accesses the initialization data structure to identify the available hardware and to determine whether a core dump is required. Because the operating system accesses the initialization data structure during the boot process, hardware that is faulty, even with transient faults, may be prevented from causing errors during the boot process or execution of the subsequent operating system prior to the loading of the user-level applications.

In Step 253, the subsequent operating system begins executing using the available hardware in accordance with one or more embodiments of the invention. In one or more embodiments of the invention, hardware excluded from available hardware is not used during execution of the subsequent operating system. Thus, the initial operating system effectively blacklists the hardware.

In Step 255, a determination is made whether a core dump is required. Specifically, the initialization data structure is accessed to determine whether a core dump is required and on which memory to perform the core dump if the core dump is required.

If a core dump is required, in Step 257, the core dump is performed on the dump memory referenced in the initialization data structure. The core dump may be performed by multiple processors in parallel in order to improve performance.

Further, as more memory is made available while performing the core dump, additional processors may be initiated and assigned to perform the core dump and/or continue execution of the operating system. In one or more embodiments of the invention, the core dump may be performed while the operating system is providing other services to user-level applications.

In one or more embodiments of the invention, the subsequent operating system performs the core dump based on the topology of system memory. Specifically, memory that enables faster access because of physical location or proximity to other components may be given a higher priority than other memory when performing the core dump. Thus, such memory is freed first for use by the subsequent operating system.

Further, in one or more embodiments of the invention, during or after performing the core dump, the subsequent operating system may perform post processing of the memory. For example, the subsequent operating system may perform analysis, network redistribution, compression, encryption, and other such functions on the dumped memory.

In Step 259, the execution of the subsequent operating system continues using dump memory and any additional components available after the core dump. Specifically, the subsequent operating system may access the initialization data structure and start execution of services and hardware components indicated in the initialization data structure.

As discussed above, once the subsequent operating system begins execution, the subsequent operating system may be an initial operating system in relation to future subsequent operating systems. Thus, FIGS. 3A-3B may be repeated with the subsequent operating system as the next initial operating system.

The following example is for illustration purposes only and not intended to limit the scope of the invention. Further, the example is simplified for clarity. In practice, for example, it may be unlikely to determine that an entire storage pool is faulty and, therefore, unusable by the subsequent operating system.

For the following example, consider the scenario in which the computer system includes eight central processing units (CPUs) (labeled CPU 0-7), five memory lists and three storage pools. In the example, consider the scenario that the FMA in the initial operating system determines that CPU 3, memory range starting at 0x5000000 and of size 0x2000000, and the storage pool "bad_pool" are all faulty. These components may have transient, intermittent faults that may not be detectable by firmware during an initial booting of an operating system. Because the FMA determined that these components are faulty, the FMA lists the components in the FMA fault data.

Next, in the example, consider the scenario in which the initial operating system fails. In the example, the failure of the initial operating system triggers the in-kernel boot loader of the initial operating system to identify the portions of memory requiring a core dump, obtain the FMA fault data, and populate the initialization data structure for the subsequent operating system. In the example, the in-kernel boot loader stores the following initialization data structure for the subsequent operating system:

```
 1 boot_info::print
 2 {
 3 boot_info_magic = "BIMN" /* boot info magic number */
 4 boot_info_cpu_avail_mask = 0xF7; /* APIC ID 3 has been blacklisted */
 5 boot_info_cpu_complete_mask = 0xff /* All the CPUs */
 6 boot_info_mem_avail_list = [ /* Memory immediately available */
 7    {
 8    bim_start_pa = 0x0
 9    bim_size = 0x1000000
10    },
11    {
12    bim_start_pa = 0x3000000
13    bim_size = 0x2000000
14    },
15 ]
16 boot_info_mem_dump_list = [ /* Memory that needs to be dumped first before being
      used */
17    {
18    bim_start_pa = 0x1000000
19    bim_size = 0x2000000
20    },
21    {
22    bim_start_pa = 0x7000000
23    bim_size = 0x2000000
24    },
25 ]
26 boot_info_mem_black_list = [    /* Memory determined to be faulty*/
27    {
28    bim_start_pa = 0x5000000
29    bim_size = 0x2000000
30    },
31 ]
32 boot_info_storage_avail_list = [ /*Memory that is available*/
33    {
34    bis_loc_name = "root_pool",   /* logical name */
35    bis_dev_name = "c8t1d0s0",    /* physical device name */
36    bis_dev_path = "/pci@0,0/pci8086,25f8@4/pci1000,3150@0/sd@0,0:a";
37    },
38    {
```

```
39    bis_loc_name = "data_pool",   /* logical name */
40    bis_dev_name = [
41       "c1t0d0"
42       "c1t1d0"
43    ]
44    bis_dev_path = [
45       "pci@0,0/pci10de,5d@d/pci1000,3150@0/sd@0,0"
46       "pci@0,0/pci10de,5d@d/pci1000,3150@0/sd@1,0"
47    ]
48    },
49 ]
50 boot_info_storage_black_list = [
51    {
52    bis_loc_name = "bad_pool",   /* logical name */
53    bis_dev_name = "c1t2d0",     /* physical device name */
54    bis_dev_path = "pci@0,0/pci10de,5d@d/pci1000,3150@0/sd@2,0"
55    },
56 ]
57 }
```

In the above example, line 1, 2 and line 57 indicate the start and end, respectively, of the initialization data structure in accordance with one or more embodiments of the invention. Line 3 provides a boot information magic number. Line 4 is a bit mask representing available processors. The bit mask, when translated to binary, shows that the CPU with APIC identifier 3 is excluded from the list of available processors. The remaining processors are available. The list of all processors in line 5 is a bitmask representing all available processors.

Continuing with the above example, lines 6-15 provide a list of all memory that is immediately available without first performing a core dump. Specifically, lines 7-10 provide a first range of memory and lines 11-14 provide a second range of memory. As shown in lines 7-10, the range of memory starting at address 0x0 and of size 0x1000000 is immediately available. Similarly, the range of memory starting at address 0x3000000 and of size 0x2000000 is immediately available.

Lines 16-25 provide a list of memory on which a core dump should be performed before the memory can be made available. Specifically, lines 17-20 provide a first range of memory and lines 21-24 provide a second range of memory. As shown in lines 17-24, the subsequent operating system needs to be performed on the range of memory starting at address 0x1000000 and of size 0x2000000, and on the range of memory starting at address 0x7000000 and of size 0x2000000.

Lines 26-31 provides a list of memory determined to be faulty by the FMA executing in the initial operating system, and, therefore, unusable by the subsequent operating system. As shown in lines 27-30, the faulty memory is memory in the range of memory starting at address 0x5000000 and of size 0x2000000.

Continuing with the above example, lines 32-49 provide a list of all storage pools that are available. Specifically, lines 34-36 provide a logical device name, a physical device name, and a path name, respectively, to one available storage pool. Similarly, lines 39, 40-43, and 44-47 provide a logical device name, a physical device name, and a path name, respectively, to another available storage pool.

Further, lines 50-55 provide a list of all storage pools that are determined faulty by the FMA executing in the initial operating system. Specifically, lines 51-54 provide a logical device name, a physical device name, and a path name, respectively, to the faulty storage pool.

Continuing with the example, the subsequent operating system uses the CPUs defined in line 4, the memory defined in lines 6-15, and the storage pools defined in lines 32-49 to perform a core dump on the memory defined in lines 16-25. While performing the core dump for the initial operating system, the subsequent operating system may load and provide services to users. Once the core dump is complete, the subsequent operating system uses the memory specified in lines 16-25. Further, the subsequent operating system may perform fault management on the CPU listed in line 5, but not in line 4, the memory listed in lines 26-31, and the storage pool listed in lines 50-56. For example, the subsequent operating system may trigger a notification to an administrator that the storage pool listed in lines 50-56 needs to be replaced.

Figure 4:
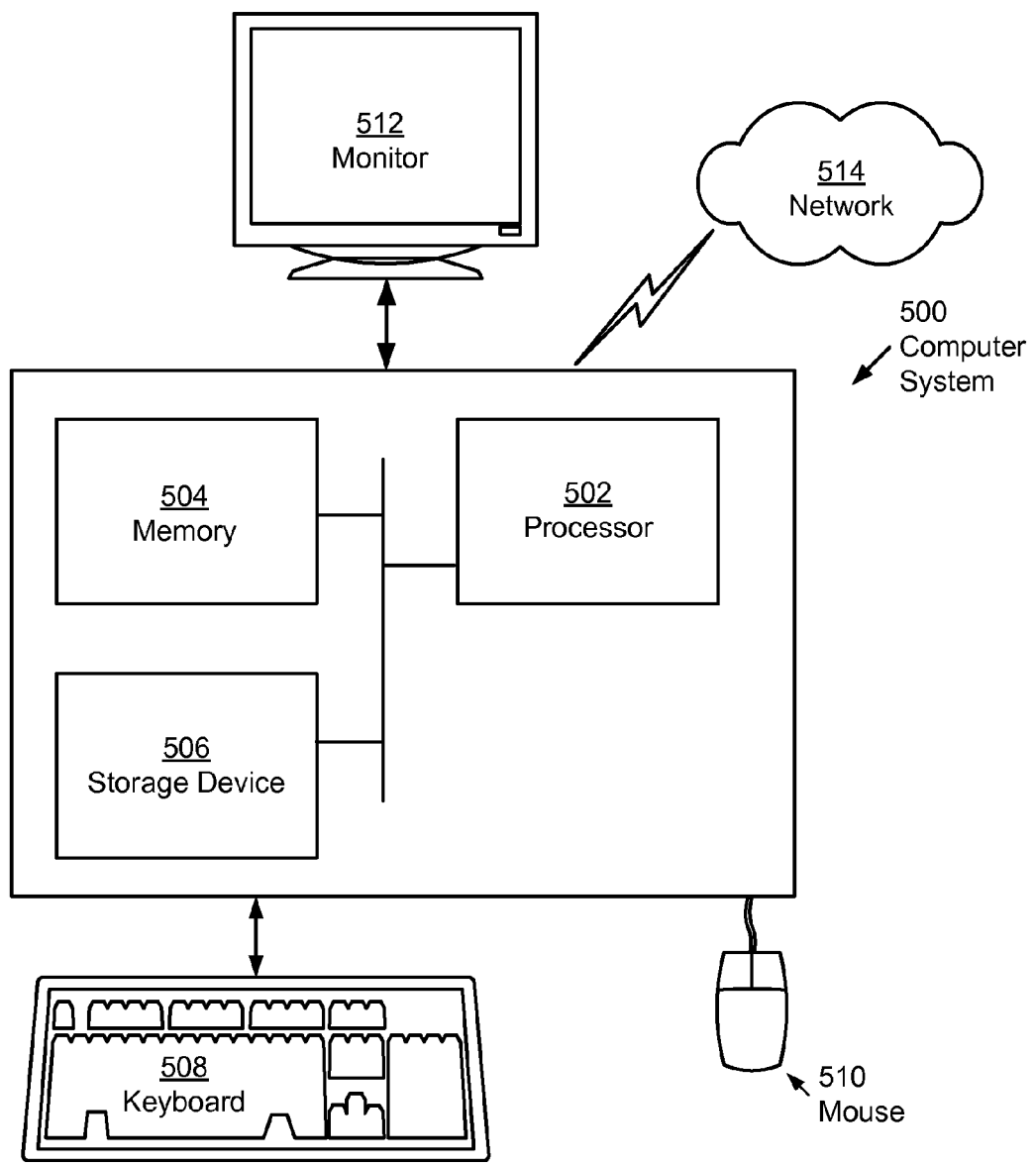
FIG. 4 shows a computer system in accordance with one or more embodiments of the invention.

Embodiments of the invention may be implemented on virtually any type of computer regardless of the platform being used. For example, as shown in FIG. 4, a computer system (500) includes one or more processor(s) (502), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). In one or more embodiments of the invention, the processor (502) is hardware. For example, the processor may be an integrated circuit. The computer system (500) may also include input means, such as a keyboard (508), a mouse (510), or a microphone (not shown). Further, the computer system (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., storage devices, operating system, etc.) may be located on a different node within the distributed system. In one embodiment of the invention, the node corresponds to a computer system. Alternatively, the node may correspond to a processor with associated physical memory. The node may alternatively correspond to a processor or an individual core of a processor with shared memory and/or resources. Further, software instructions to perform embodiments of the invention may be stored, temporarily or permanently, on a computer readable medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for transferring execution to a subsequent operating system, the method comprising:
   receiving, by a fault management architecture, an error about a hardware component located in a computer system during execution of the initial operating system;
   detecting, based on the error, a hardware fault of the hardware component;
   disabling the hardware component based on the hardware fault during execution of the initial operating system;
   storing, by the fault management architecture during execution of the initial operating system and as part of system data, fault data identifying the hardware component and identifying the disabling of the hardware component;
   rebooting the computer system by:
     initializing an in-kernel boot loader, wherein the in-kernel boot loader executes in a kernel of the initial operating system;
     populating, by the in-kernel boot loader, an initialization data structure using the system data gathered during the execution of the initial operating system, wherein populating the initialization data structure comprises:
       generating an available hardware list of available hardware using the system data; and
       excluding, while generating the available hardware list, the hardware component from the available hardware list based on the fault data identifying the hardware component and the disabling of the hardware component;
     storing, by the in-kernel boot loader, the initialization data structure in memory, wherein the memory is separate from a file system of the initial operating system and the subsequent operating system;
     loading, by the in-kernel boot loader, the subsequent operating system; and
     transferring control of the computer system from the initial operating system to the subsequent operating system, wherein the subsequent operating system accesses the initialization data structure from the memory to identify the available hardware; and
   executing the subsequent operating system on the available hardware of the computer system.

2. The method of claim 1, wherein the available hardware is a subset of hardware comprised in the computer system.

3. The method of claim 1, wherein the hardware fault is transient.

4. The method of claim 1, further comprising:
   detecting a failure of the initial operating system;
   storing, in the initialization data structure, an identifier of a used portion of the memory, wherein the used portion of the memory is used by the initial operating system during failure of the initial operating system;
   accessing, by the subsequent operating system, the initialization data structure to obtain the identifier of the used portion of the memory; and
   performing, by the subsequent operating system, a core dump of the used portion of the memory.

5. The method of claim 4, further comprising:
   storing, in the initialization data structure, an identifier of an available portion of the memory,
   wherein the subsequent operating system executes using the available portion of the memory while the subsequent operating system is performing the core dump of the used portion of the memory, and
   wherein the subsequent operating system uses the used portion of the memory and the available portion of the memory after the core dump is completed.

6. The method of claim 4, wherein a subset of available processors execute the subsequent operating system while performing the core dump, and wherein all of the available processors execute the subsequent operating system after the core dump is completed.

7. The method of claim 6, wherein the initialization data comprises an identifier of the subset of the available processors.

8. A computer system comprising:
   a processor;
   memory for storing an initialization data structure, wherein the memory is separate from a file system of an initial operating system and a subsequent operating system; and
   software instructions stored in the memory for causing the computer system to:
     receive, by a fault management architecture, an error about a hardware component located in the computer system during execution of the initial operating system;
     detect, based on the error, a hardware fault of the hardware component;
     disable the hardware component based on the hardware fault during execution of the initial operating system;
     store, by the fault management architecture during execution of the initial operating system and as part of system data, fault data identifying the hardware component and identifying the disabling of the hardware component;
     reboot a computer system by:
       initializing an in-kernel boot loader, wherein the in-kernel boot loader executes in a kernel of the initial operating system;
       populating, by the in-kernel boot loader, the initialization data structure using the system data gathered during the execution of the initial operating system, wherein populating the initialization data structure comprises:
         generating an available hardware list of available hardware using the system data and
         excluding, while generating the available hardware list, the hardware component from the available hardware list based on the fault data identifying the hardware component and the disabling of the hardware component;
       storing the initialization data structure in the memory;
       loading, by the in-kernel boot loader, the subsequent operating system; and
       transferring control of the computer system from the initial operating system to the subsequent operating system, wherein the subsequent operating system, wherein the subsequent operating system accesses the initialization data structure from the memory to identify the available hardware, and wherein the subsequent operating system executes on the available hardware of the computer system.

9. The computer system of claim 8, wherein the available hardware is a subset of hardware comprised in the computer system.

10. The computer system of claim 8, wherein the hardware fault is temporary.

11. The computer system of claim 8, wherein the software instructions further cause the computer system to detect a failure of the operating system, wherein rebooting the computer system further comprises:
store, in the initialization data structure, an identifier of a used portion of the memory, wherein the used portion of the memory is used by the initial operating system during failure of the initial operating system; and
access, by the subsequent operating system, the initialization data structure to obtain the identifier of the used portion of the memory, and
wherein the subsequent operating system performs a core dump of the used portion of the memory.

12. The computer system of claim 11, wherein rebooting the computer system further comprises:
storing, in the initialization data structure, an identifier of an available portion of the memory,
wherein the subsequent operating system executes using the available portion of the memory while the subsequent operating system is performing the core dump of the used portion of the memory, and
wherein the subsequent operating system uses the used portion of the memory and the available portion of the memory after the core dump is completed.

13. A non-transitory computer readable medium comprising executable instructions for transferring execution to a subsequent operating system, which when executed by a processor performs a method, the method comprising:
receiving, by a fault management architecture, an error about a hardware component located in a computer system during execution of the initial operating system;
detecting, based on the error, a hardware fault of the hardware component;
disabling the hardware component based on the hardware fault during execution of the initial operating system;
storing, by the fault management architecture during execution of the initial operating system and as part of system data, fault data identifying the hardware component and identifying the disabling of the hardware component; and
rebooting the computer system by:
initializing an in-kernel boot loader, wherein the in-kernel boot loader executes in a kernel of the initial operating system;
populating, by the in-kernel boot loader, an initialization data structure using the system data gathered during the execution of the initial operating system,
wherein populating the initialization data structure comprises:
generating an available hardware list of available hardware using the system data and
excluding, while generating the available hardware list, the hardware component from the available hardware list based on the fault data identifying the hardware component and the disabling of the hardware component;
storing, by the in-kernel boot loader, the initialization data structure in memory, wherein the memory is separate from a file system of the initial operating system and the subsequent operating system;
loading, by the in-kernel boot loader, the subsequent operating system; and
transferring control of the computer system from the initial operating system to the subsequent operating system, wherein the subsequent operating system accesses the initialization data structure from the memory to identify available hardware,
wherein the subsequent operating system executes on the available hardware of the computer system.

14. The non-transitory computer readable medium of claim 13, wherein the method further comprises:
detecting a failure of the operating system; and
storing, in the initialization data structure, an identifier of a used portion of the memory, wherein the used portion of the memory is used by the initial operating system during failure of the initial operating system,
wherein the subsequent operating system accesses the initialization data structure to obtain the identifier of the used portion of the memory, and
wherein the subsequent operating system performs a core dump of the used portion of the memory.

\* \* \* \* \*